(12) United States Patent
Yang et al.

(10) Patent No.: US 12,072,572 B1
(45) Date of Patent: Aug. 27, 2024

(54) DISPLAY PANELS

(71) Applicant: TCL CHINA STAR OPTOELECTRONICS TECHNOLOGY CO., LTD., Guangdong (CN)

(72) Inventors: Xinru Yang, Guangdong (CN); Jiacong Guo, Guangdong (CN); Rentang Zhao, Guangdong (CN); Ji Li, Guangdong (CN); Chungching Hsieh, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/523,648

(22) Filed: Nov. 29, 2023

(30) Foreign Application Priority Data

Sep. 26, 2023 (CN) .......................... 202311255688.3

(51) Int. Cl.
*G02F 1/1335* (2006.01)
*G02F 1/1337* (2006.01)

(52) U.S. Cl.
CPC .... *G02F 1/133528* (2013.01); *G02F 1/13356* (2021.01); *G02F 1/1337* (2013.01)

(58) Field of Classification Search
None
See application file for complete search history.

(56) References Cited

U.S. PATENT DOCUMENTS

2004/0036817 A1\* 2/2004 Paukshto .......... G02F 1/133528
349/56

FOREIGN PATENT DOCUMENTS

CN 211627953 U \* 10/2020
CN 117666007 A \* 3/2024

\* cited by examiner

*Primary Examiner* — Phu Vu
(74) *Attorney, Agent, or Firm* — PV IP PC; Wei Te Chung; Zhigang Ma

(57) ABSTRACT

Disclosed is a display panel, including a liquid crystal cell and a polarizing assembly disposed on the liquid crystal cell. The liquid crystal cell includes a display area, a transparent homogeneous dielectric layer is disposed between the polarizing assembly and the display area. The polarizing assembly includes: a substrate, a first polarizer and second polarizers. The first polarizer includes a first alignment layer and a polarizing layer, the first alignment layer is disposed on the substrate, and the polarizing layer is disposed on a side of the first alignment layer facing away from the substrate. The second polarizers are disposed on the substrate, and two adjacent second polarizers are disposed on opposite sides of the first alignment layer.

17 Claims, 8 Drawing Sheets

DISPLAY PANELS

CROSS-REFERENCE TO RELATED APPLICATION

This application claims priority to Chinese Patent Application No. 202311255688.3, filed on Sep. 26, 2023, the disclosure of which is incorporated herein by reference in its entirety.

TECHNICAL FIELD

The present disclosure relates to the field of display technologies, and in particular, to a display panel.

BACKGROUND

Liquid crystal displays (LCDs) usually include two polarizers that are respectively disposed on a side of a color film substrate and a side of an array substrate. The polarizer disposed on the side of the color film substrate is called as an upper polarizer, and the polarizer disposed on the side of the array substrate is called as a lower polarizer. Due to requirements of a polarizer production process, manufacturers can provide oversized upper polarizers, but it is difficult to provide lower polarizers that meet sizes required by an oversized LCD, and thus splicing is required to realize the lower polarizers required in the oversized LCD.

Conventional polarizers are made by a roll-to-roll preparation method, and a maximum width of the polarizer made by the roll-to-roll method is 2500 mm, which is unable to meet a requirement for sizes of the polarizer on the side of the array substrate in the oversized LCD panel (>110 inches), thereby limiting the development of the oversized LCD products. Currently the oversized LCD products can only be realized through LCD splicing. However, even if panel factories narrow a border of a LCD screen, visible splicing black lines still are present in the spliced LCD screen. Another technology that can realize the oversized display products is a Mini-light-emitting diode (Mini-LED)/Micro-LED direct display technology. This technology is immature, a yield of LED transfer technologies is low, and its high price is unacceptable to consumers. Therefore, acceptable oversized display products, without splicing black lines, by the consumers on the current market are still empty.

At present, a size of a display screen that can be prepared by the 11th generation line (G11) is 150 inches. Due to the limitation of the width of the polarizer, a size of the largest LCD product on the market is 110 inches. Existing display panels solve the width problem by splicing two polarizers on the side of the array substrate, but the splicing seam of the polarizers is prone to a rainbow pattern phenomenon due to uneven color mixing of light.

SUMMARY

The present disclosure provides a display panel that can improve the rainbow pattern phenomenon caused by uneven color mixing of light at the splicing seam of polarizers.

An embodiment of the present disclosure provides a display panel, including: a liquid crystal cell and a polarizing assembly. The liquid crystal cell includes a display area, the polarizing assembly is disposed on the liquid crystal cell, and a transparent homogeneous dielectric layer is disposed between the polarizing assembly and the display area of the liquid crystal cell. The polarizing assembly includes a substrate, a first polarizer and second polarizers. The first polarizer includes a first alignment layer and a polarizing layer, the first alignment layer is disposed on the substrate, and the polarizing layer is disposed on a side of the first alignment layer facing away from the substrate. The second polarizers are disposed on the substrate, and two adjacent second polarizers are disposed on opposite sides of the first alignment layer.

Optionally, in some embodiments of the present disclosure, the liquid crystal cell further includes a border area, the polarizing assembly is connected with the border area of the liquid crystal cell. A cavity is defined between the polarizing assembly and the display area of the liquid crystal cell, and the transparent homogeneous dielectric layer is an air layer in the cavity. Alternatively, a transparent adhesive layer is filled between the polarizing assembly and the liquid crystal cell, and the transparent homogeneous dielectric layer is the transparent adhesive layer.

Optionally, in some embodiments of the present disclosure, the substrate is disposed on the liquid crystal cell, the first polarizer is disposed on a side of the substrate facing away from the liquid crystal cell, and the transparent homogeneous dielectric layer is disposed between the display area of the liquid crystal cell and the substrate. Alternatively, the first polarizer and the second polarizers are disposed on the liquid crystal cell, the substrate is disposed on a side of the first polarizer and the second polarizers facing away from the liquid crystal cell, and the transparent homogeneous dielectric layer is disposed between the display area of the liquid crystal cell and the first polarizer and the second polarizers.

Optionally, in some embodiments of the present disclosure, the display panel further includes a third polarizer, the polarizing assembly is disposed on one of a light-emitting surface and a light-entering surface of the liquid crystal cell, and the third polarizer is disposed on the other of the light-emitting surface and the light-entering surface of the liquid crystal cell.

Optionally, in some embodiments of the present disclosure, each second polarizer partially covers the first alignment layer, an orthographic projection of the polarizing layer on the substrate is in non-overlapping with an orthographic projection of each second polarizer on the substrate, and a distance between the polarizing layer and each second polarizer is less than or equal to a predetermined threshold; or each second polarizer partially covers the polarizing layer.

Optionally, in some embodiments of the present disclosure, a width of an overlapping area of each second polarizer and the first alignment layer along a first direction is greater than or equal to 0.1 mm; or a width of an overlapping area of each second polarizer and the polarizing layer along a first direction is greater than or equal to 0.1 mm.

Optionally, in some embodiments of the present disclosure, the predetermined threshold is in a range from 0 mm to 3 mm.

Optionally, in some embodiments of the present disclosure, a thickness of each second polarizer is greater than a sum of a thickness of the first alignment layer and a thickness of the polarizing layer.

Optionally, in some embodiments of the present disclosure, the thickness of the first alignment layer is in a range from 0.1 μm to 5 μm, the thickness of the polarizing layer is in a range from 0.1 μm to 5 μm, and the thickness of each second polarizer is in a range from 100 μm to 200 μm.

Optionally, in some embodiments of the present disclosure, the display panel further includes a reflective layer, and the reflective layer is disposed on a side wall of each second polarizer proximate to the polarizing layer.

Optionally, in some embodiments of the present disclosure, the display panel further includes a transparent material layer covering the polarizing layer; a sum of the thickness of the first alignment layer, the thickness of the polarizing layer and a thickness of the transparent material layer is greater than or equal to the thickness of the second polarizer.

Optionally, in some embodiments of the present disclosure, each second polarizer includes an optical compensation layer, a second alignment layer and a protective layer, the second alignment layer is disposed on a side of the optical compensation layer facing away from the liquid crystal cell, and the protective layer is disposed on a side of the second alignment layer facing away from the liquid crystal cell; and an absolute value of a difference between a refractive index of the transparent material layer and a refractive index of the protective layer is less than 0.1.

Optionally, in some embodiments of the present disclosure, a refractive index of the transparent material layer is in a range from 1.5 to 1.7.

The display panel provided by the present disclosure includes a liquid crystal cell and a polarizing assembly, the liquid crystal cell includes a display area, the polarizing assembly is disposed on the liquid crystal cell, and a transparent homogeneous dielectric layer is disposed between the polarizing assembly and the display area of the liquid crystal cell. The polarizing assembly includes a substrate, a first polarizer and second polarizers; the first polarizer includes a first alignment layer and a polarizing layer, the first alignment layer is disposed on the substrate, and the polarizing layer is disposed on a side of the first alignment layer facing away from the substrate. The second polarizers are disposed on the substrate, and two adjacent second polarizers are disposed on opposite sides of the first alignment layer. According to the display panel provided by the present disclosure, the transparent homogeneous dielectric layer is disposed between the liquid crystal cell and the polarizing assembly, so that the distribution of light from the liquid crystal cell into the polarizing assembly or from the polarizing assembly into the liquid crystal cell is more uniform, thereby alleviating a rainbow phenomenon caused by uneven color mixing of light rays, and improving the display effect of the display panel.

DETAILED DESCRIPTION

The following will describe the technical solutions in the embodiments of the present disclosure in conjunction with the accompanying drawings. The described technical solutions are only used to explain and illustrate the ideas of the present disclosure, and should not be considered as a limitation on the scope of the present disclosure.

The various embodiments provided in the present disclosure are similar, and features in different embodiments may be combined with each other.

Figure 1:
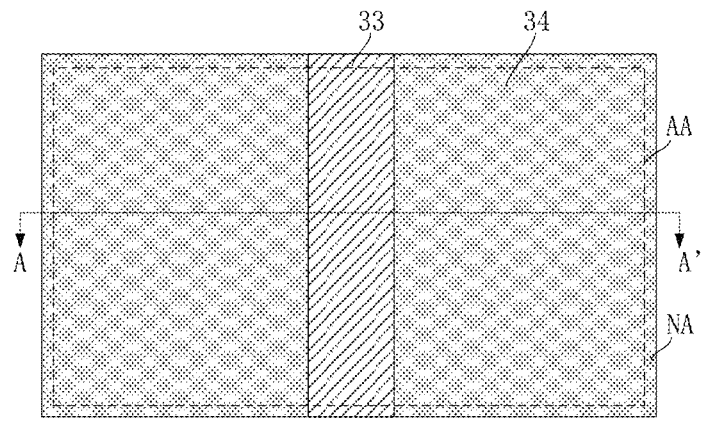
FIG. 1 illustrates a top view of a display panel provided in some embodiments of the present disclosure.
Figure 2:
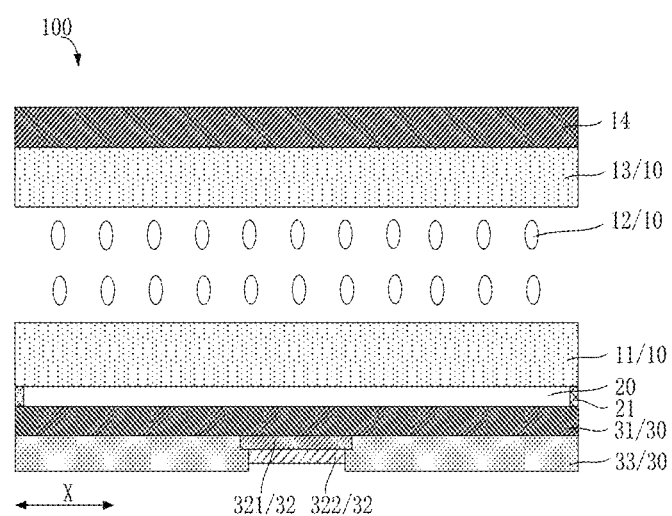
FIG. 2 illustrates a first cross-sectional view of the display panel provided in FIG. 1 along an AA' direction.

As shown in FIGS. 1 and 2, an embodiment of the present disclosure provides a display panel 100, including: a liquid crystal cell 10 and a polarizing assembly 30. The liquid crystal cell 10 includes a display area AA, and the polarizing assembly 30 is disposed on the liquid crystal cell 10. A transparent homogeneous dielectric layer 20 is disposed between the polarizing assembly 30 and the display area AA of the liquid crystal cell 10. The polarizing assembly 30 includes: a substrate 31, a first polarizer 32 and second polarizers 33. The first polarizer 32 includes a first alignment layer 321 and a polarizing layer 322. The first alignment layer 321 is disposed on the substrate 31, and the polarizing layer 322 is disposed on a side of the first alignment layer 321 facing away from the substrate 31. The second polarizers 33 are disposed on the substrate 31, and two adjacent second polarizers 33 are disposed on two opposite sides of the first alignment layer 321.

According to the present disclosure, the second polarizers 33 in the display panel 100 are provided to partially cover the first alignment layer 321, so that a thickness of the first alignment layer 321 may be in a range from 0.1 micrometers ($\mu m$) to 5 $\mu m$, which is thinner than a thickness of the existing polarizers (from 100 $\mu m$ to 200 $\mu m$), and no bubbling and warping may occur after the second polarizers 33 cover the first alignment layer 321. In addition, the polarizing layer 322 is disposed on a non-overlapping area of the first alignment layer 321 and the second polarizers 33, so that the first polarizer 32 is formed at a splicing position of the two second polarizers 33, thereby realizing a seamless splicing and solving the problem of light leakage caused by the existence of a seam at the splicing position of the second polarizers 33. Furthermore, the transparent homogeneous dielectric layer 20 is provided between the liquid crystal cell 10 and the polarizing assembly 30 to make the distribution of light from the liquid crystal cell 10 into the polarizing assembly 30 or from the polarizing assembly 30 into the liquid crystal cell 10 more uniform, so as to improve a rainbow pattern phenomenon caused by uneven color mixing of light, and improve the display effect of the display panel. The above-described setup also greatly reduces requirements for the precision of the process, simplifies the manufacturing process, and improves the feasibility of the manufacturing process.

In an embodiment of the present disclosure, each second polarizer 33 partially covers the first alignment layer 321, an orthographic projection of the polarizing layer 322 on the substrate 31 does not overlap an orthographic projection of the second polarizer 33 on the substrate 31, and a distance between the polarizing layer 322 and the second polarizer 33 is less than or equal to a predetermined threshold. That is, the orthographic projection of the polarizing layer 322 on the liquid crystal cell 10 is located outside the orthographic projection of the second polarizer 33 on the liquid crystal cell 10.

In an embodiment of the present disclosure, the liquid crystal cell 10 includes an array substrate 11, a liquid crystal layer 12, and a counter substrate 13. The display panel further includes a third polarizer 14. The liquid crystal layer 12 is disposed between the array substrate 11 and the counter substrate 13. The polarizing assembly 30 is disposed on one of a light-emitting surface of the liquid crystal cell 10 and a light-entering surface of the liquid crystal cell 10, and the third polarizer 14 is disposed on the other of the light-emitting surface of the liquid crystal cell 10 and the light-entering surface of the liquid crystal cell 10. Specifically, the transparent homogeneous dielectric layer 20 is disposed on a side of the array substrate 11 facing away from the counter substrate 13, or the third polarizer 14 is disposed on a side of the counter substrate 13 facing away from the array substrate 11.

In an embodiment of the present disclosure, the substrate 31 is disposed on the liquid crystal cell 10, the first polarizer 32 is disposed on a side of the substrate 31 facing away from the liquid crystal cell 10, and the transparent homogeneous dielectric layer 20 is disposed between the display area AA of the liquid crystal cell 10 and the substrate 31. That is, the transparent homogeneous dielectric layer 20 is located between the substrate 31 and the liquid crystal cell 10, and light from the polarizing assembly 30 passes through the transparent homogeneous dielectric layer 20 and then runs into the liquid crystal cell 10.

In an embodiment of the present disclosure, the liquid crystal cell 10 further includes a border area NA. The polarizing assembly 30 is connected to the border area NA of the liquid crystal cell 10. A cavity is defined between the polarizing assembly 30 and the display area AA of the liquid crystal cell 10, and the transparent homogeneous dielectric layer 20 is an air layer in the cavity. Specifically, a protruding portion 21 is disposed on an edge of a side of the substrate 31 proximate to the liquid crystal cell 10, and a material of the protruding portion 21 includes a transparent colloidal material. After the substrate 31 is combined with the liquid crystal cell 10, the protruding portion 21 separates the substrate 31 from the liquid crystal cell 10 to form the air layer between the substrate 31 and the liquid crystal cell 10. By forming the air layer between the substrate 31 and the liquid crystal cell 10, the distribution of light from the polarizing assembly 30 into the liquid crystal cell 10 is more uniform, so as to alleviate the rainbow pattern phenomenon caused by uneven color mixing of light rays, and to improve the display effect of the display panel.

In an embodiment of the present disclosure, the protruding portion 21 is in a strip shape, and extends in a direction parallel to a surface of the substrate 31 to which it is proximate. Two strip shaped protruding portions 21 support the substrate 31 from two opposite sides of the substrate 31, so as to increase an interface area between a backside of the substrate 31 and the air layer while maintaining a sufficiently stable fit between the substrate 31 and the liquid crystal cell 10.

In an embodiment of the present disclosure, the protruding portion 21 is of a rectangular frame structure. Outer side surfaces of four border strips in the protruding portion 21 are flush with four side surfaces of the substrate 31.

In an embodiment of the present disclosure, the substrate 31 includes a glass substrate or a polymer film. Specifically, the polymer film includes at least one of a polyimide film, a polyethylene terephthalate film, a polycarbonate film, or a polymethyl methacrylate film. The polymer film can be made directly on a production line, and thus processes such as carrying can be reduced and the production efficiency can be improved.

In an embodiment of the present disclosure, a thickness of the first alignment layer 321 is in the range from 0.1 μm to 5 μm. Specifically, the thickness values of the first alignment layer 321 include 0.1 μm, 0.2 μm, 0.3 μm, 0.4 μm, 0.5 μm, 0.6 μm, 0.7 μm, 0.8 μm, 0.9 μm, 1 μm, 1.1 μm, 1.2 μm, 1.3 μm, 1.4 μm, 1.5 μm, 1.6 μm, 1.7 μm, 1.8 μm, 1.9 μm, 2 μm, 2.1 μm, 2.2 μm, 2.3 μm, 2.4 μm, 2.5 μm, 2.6 μm, 2.7 μm, 2.8 μm, 2.9 μm, 3 μm, 3.1 μm, 3.2 μm, 3.3 μm, 3.4 μm, 3.5 μm, 3.6 μm, 3.7 μm, 3.8 μm, 3.9 μm, 4 μm, 4.1 μm, 4.2 μm, 4.3 μm, 4.4 μm, 4.5 μm, 4.6 μm, 4.7 μm, 4.8 μm, 4.9 μm and 5 μm.

In an embodiment of the present disclosure, a thickness of the polarizing layer 322 is in a range from 0.1 μm to 5 μm. Specifically, the thickness values of the polarizing layer 322 include 0.1 μm, 0.2 μm, 0.3 μm, 0.4 μm, 0.5 μm, 0.6 μm, 0.7 μm, 0.8 μm, 0.9 μm, 1 μm, 1.1 μm, 1.2 μm, 1.3 μm, 1.4 μm, 1.5 μm, 1.6 μm, 1.7 μm, 1.8 μm, 1.9 μm, 2 μm, 2.1 μm, 2.2 μm, 2.3 μm, 2.4 μm, 2.5 μm, 2.6 μm, 2.7 μm, 2.8 μm, 2.9 μm, 3 μm, 3.1 μm, 3.2 μm, 3.3 μm, 3.4 μm, 3.5 μm, 3.6 μm, 3.7 μm, 3.8 μm, 3.9 μm, 4 μm, 4.1 μm, 4.2 μm, 4.3 μm, 4.4 μm, 4.5 μm, 4.6 μm, 4.7 μm, 4.8 μm, 4.9 μm and 5 μm.

In an embodiment of the present disclosure, a thickness of the first polarizer 32 is in a range from 0.2 μm to 10 μm.

In an embodiment of the present disclosure, a thickness of the second polarizer 33 is in a range from 100 μm to 200 μm. Specifically, the thickness values of the second polarizer 33 include 100 μm, 101 μm, 102 μm, 103 μm, 104 μm, 105 μm, 106 μm, 107 μm, 108 μm, 109 μm, 110 μm, 111 μm, 112 μm, 113 μm, 114 μm, 115 μm, 116 μm, 117 μm, 118 μm, 119 μm and 120 μm.

In an embodiment of the present disclosure, the predetermined threshold is in a range from 0 mm to 3 mm. That is, the distance between the polarizing layer 322 and the second polarizer 33 is greater than or equal to 0 mm and less than or equal to 0.05 mm. Specifically, the distance between the polarizing layer 322 and the second polarizer 33 may be 0 mm, 0.01 mm, 0.02 mm, 0.03 mm, 0.04 mm or 0.05 mm. Preferably, the distance between the polarizing layer 322 and the second polarizer 33 is 0 mm. Furthermore, a sum of distances between the polarizing layer 322 and two adjacent second polarizers 33 is less than or equal to 0.1 mm. Preferably, a width of the polarizing layer 322 in a first direction X is equal to a distance between two adjacent second polarizers 33.

In an embodiment of the present disclosure, a thickness of the second polarizer 33 is greater than a sum of a thickness of the first alignment layer 321 and a thickness of the polarizing layer 322. Specifically, the sum of the thickness of the first alignment layer 321 and the thickness of the polarizing layer 322 is less than or equal to 1 μm. The thickness of the second polarizer 33 is in a range from 140 μm to 170 μm, and the thicknesses of the second polarizer 33 include 140 μm, 145 μm, 150 μm, 155 μm, 160 μm, 165 μm and 170 μm.

In an embodiment of the present disclosure, a material of the first alignment layer 321 includes at least one of a photo alignment material, a mechanical alignment material or a lyotropic liquid crystal system material. The photo alignment material includes photo alignment polyimide, which can achieve alignment function by ultraviolet irradiation. Specifically, the mechanical alignment material includes polyimide, in which a surface of an alignment layer is rubbed by a rubbing device to form multiple alignment grooves, and when a light transmission axis is along the first direction X, an extension direction of each alignment groove is along a second direction, which is perpendicular to the first direction X, and the alignment grooves are arranged at intervals along the first direction X, so that the alignment layer has an alignment function.

In an embodiment of the present disclosure, the light transmission axis direction in the alignment layer and the polarizing layer 322 is consistent with the absorption axis direction in the second polarizer 33. Furthermore, the first polarizer 32 and the second polarizer 33 have the same light transmittance.

In an embodiment of the present disclosure, a width of the overlapping area of the second polarizer 33 and the first alignment layer 321 along the first direction X is greater than or equal to 0.1 mm. Specifically, the width of the overlapping area of the second polarizer 33 and the first alignment layer 321 along the first direction X may be 0.1 mm, 0.2 mm, 0.3 mm, 0.4 mm, 0.5 mm, 0.6 mm, 0.7 mm, 0.8 mm, 0.9 mm and 1 mm.

In an embodiment of the present disclosure, the width of the polarizing layer 322 along the first direction X is less than 3 mm. Specifically, the width of the polarizing layer 322 in the first direction X is 2.5 mm, 2 mm, 1.5 mm, 1 mm, 0.8 mm or 0.5 mm. The width of the polarizing layer 322 along the first direction X is equal to the distance between two adjacent second polarizers 33.

Figure 3:
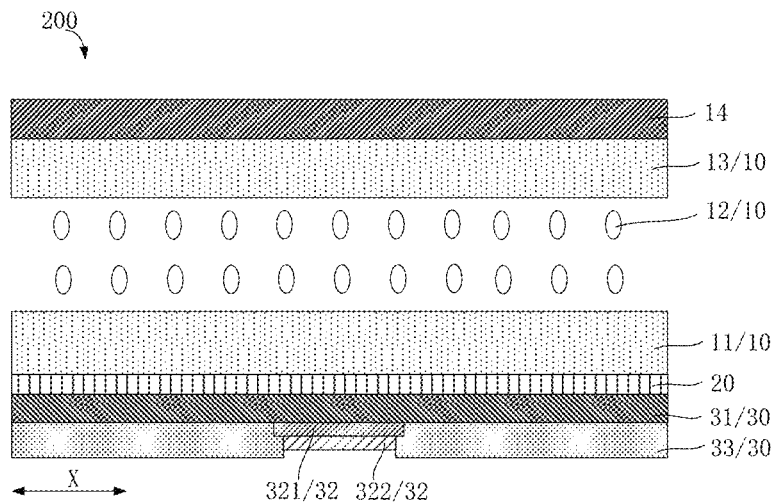
FIG. 3 illustrates a second cross-sectional view of the display panel provided in FIG. 1 along an AA' direction.

As shown in FIG. 3, an embodiment of the present disclosure provides a display panel 200. The difference between the display panel 200 and the display panel 100 is that a transparent adhesive layer is filled between the polarizing assembly 30 and the liquid crystal cell 10 in the display panel 200, and the transparent homogeneous dielectric layer 20 is the transparent adhesive layer. Specifically, the transparent adhesive layer is disposed on a side of the substrate 31 proximate to the liquid crystal cell 10.

By forming the transparent adhesive layer between the substrate 31 and the liquid crystal cell 10, the distribution of light from the polarizing assembly 30 into the liquid crystal cell 10 is more uniform, so as to alleviate the rainbow pattern phenomenon caused by uneven color mixing of light and improve the display effect of the display panel.

Other structures in the display panel 200 are the same as those in the display panel 100.

Figure 4:
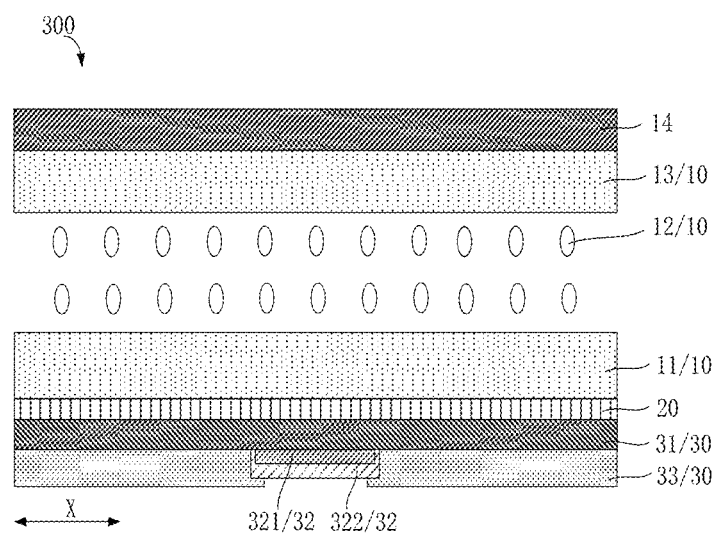
FIG. 4 illustrates a third cross-sectional view of the display panel provided in FIG. 1 along an AA' direction.

As shown in FIG. 4, an embodiment of the present disclosure provides a display panel 300. The difference between the display panel 300 and the display panel 100 is that the second polarizer 33 in the display panel 300 partially covers the polarizing layer 322.

In an embodiment of the present disclosure, a width of an overlapping area of the second polarizer 33 and the polarizing layer 322 along the first direction X is greater than or equal to 0.1 mm. Specifically, the width of the overlapping area of the second polarizer 33 and the polarizing layer 322 along the first direction X may be 0.1 mm, 0.2 mm, 0.3 mm, 0.4 mm, 0.5 mm, 0.6 mm, 0.7 mm, 0.8 mm, 0.9 mm, or 1 mm.

Other structures in the display panel 300 are the same as those in the display panel 100.

Figure 5:
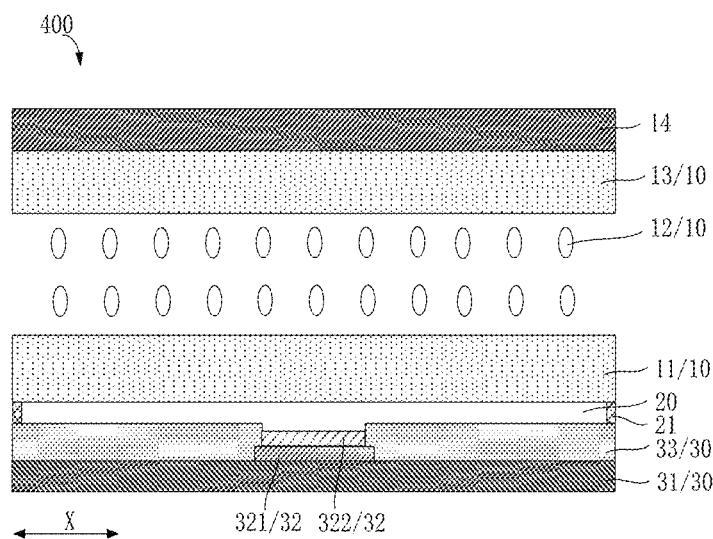
FIG. 5 illustrates a fourth cross-sectional view of the display panel provided in FIG. 1 along an AA' direction.

As shown in FIG. 5, an embodiment of the present disclosure provides a display panel 400. The display panel 400 is different from the display panel 100 in that the second polarizers 33 are disposed on the liquid crystal cell 10 in the display panel 400, the substrate 31 is disposed on a side of the second polarizers 33 facing away from the liquid crystal cell 10, and the transparent homogeneous dielectric layer 20 is disposed between the display area of the liquid crystal cell 10 and the second polarizers 33.

In an embodiment of the present disclosure, a protruding portion 21 is disposed on an edge of each second polarizer 33 proximate to the liquid crystal cell 10. After each second polarizer 33 is combined with the liquid crystal cell 10, the protruding portion 21 separates the second polarizer 33 from the liquid crystal cell 10 and forms an air layer between the second polarizer 33 and the liquid crystal cell 10. By forming the air layer between the second polarizer 33 and the liquid crystal cell 10, the distribution of light from the polarizing assembly 30 into the liquid crystal cell 10 is more uniform, so as to alleviate the rainbow pattern phenomenon caused by uneven color mixing of light and improve the display effect of the display panel.

Other structures in the display panel 400 are the same as those in the display panel 100.

Figure 6:
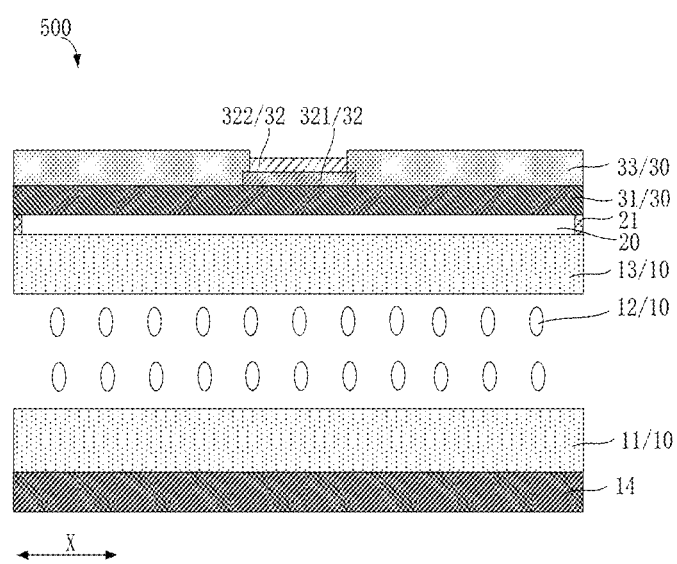
FIG. 6 illustrates a fifth cross-sectional view of the display panel provided in FIG. 1 along an AA' direction.

As shown in FIG. 6, an embodiment of the present disclosure provides a display panel 500. The difference between the display panel 500 and the display panel 100 is that the transparent homogeneous dielectric layer 20 in the display panel 500 is disposed on a side of the counter substrate 13 facing away from the array substrate 11, and the third polarizer 14 is disposed on a side of the array substrate 11 facing away from the counter substrate 13. The substrate 31 is disposed on the liquid crystal cell 10, the first polarizer 32 is disposed on a side of the substrate 31 facing away from the liquid crystal cell 10, and the transparent homogeneous dielectric layer 20 is disposed between the display area of the liquid crystal cell 10 and the substrate 31.

In an embodiment of the present disclosure, a protruding portion 21 is disposed on an edge of the substrate 31 proximate to the liquid crystal cell 10, and a material of the protruding portion 21 includes a transparent colloid material. After the substrate 31 is combined with the liquid crystal cell 10, the protruding portion 21 separates the substrate 31 from the liquid crystal cell 10 and forms an air layer between the substrate 31 and the liquid crystal cell 10. By forming the air layer between the substrate 31 and the liquid crystal cell 10, the distribution of light from the polarizing assembly 30 into the liquid crystal cell 10 is more uniform, so as to alleviate the rainbow pattern phenomenon caused by uneven color mixing of light and improve the display effect of the display panel.

Other structures in the display panel 500 are the same as those in the display panel 100.

Figure 7:
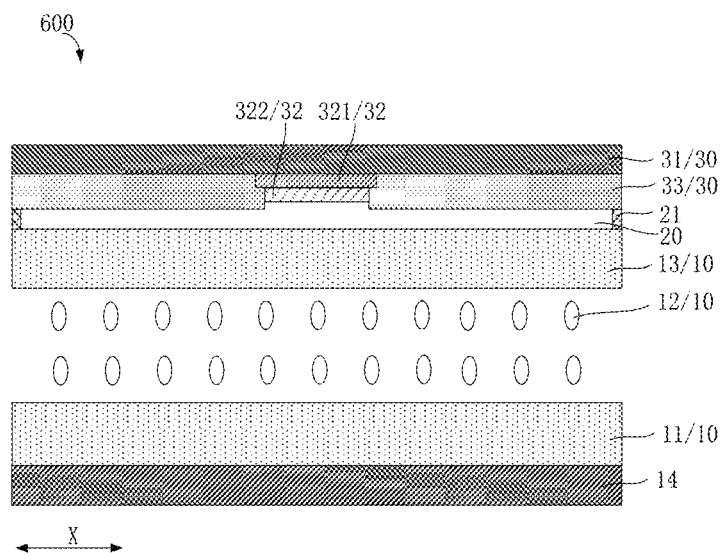
FIG. 7 illustrates a sixth cross-sectional view of the display panel provided in FIG. 1 along an AA' direction.

As shown in FIG. 7, an embodiment of the present disclosure provides a display panel 600. The difference between the display panel 600 and the display panel 100 is that a transparent homogeneous dielectric layer 20 in the display panel 600 is disposed on a side of the counter substrate 13 facing away from the array substrate 11, and the third polarizer 14 is disposed on a side of the array substrate 11 facing away from the counter substrate 13. Each second polarizer 33 is disposed on the liquid crystal cell 10, the substrate 31 is disposed on a side of the second polarizer 33 facing away from the liquid crystal cell 10, and the transparent homogeneous dielectric layer 20 is disposed between the display area of the liquid crystal cell 10 and the second polarizer 33.

In an embodiment of the present disclosure, a protruding portion 21 is disposed on an edge of the second polarizer 33 proximate to the liquid crystal cell 10. After the second polarizer 33 is combined with the liquid crystal cell 10, the protruding portion 21 separates the second polarizer 33 from the liquid crystal cell 10 and forms an air layer between the second polarizer 33 and the liquid crystal cell 10. By forming the air layer between the second polarizer 33 and the liquid crystal cell 10, the distribution of light from the polarizing assembly 30 into the liquid crystal cell 10 is more uniform, so as to alleviate the rainbow pattern phenomenon caused by uneven color mixing of light and improve the display effect of the display panel.

Other structures in the display panel 600 are the same as those in the display panel 100.

Figure 8:
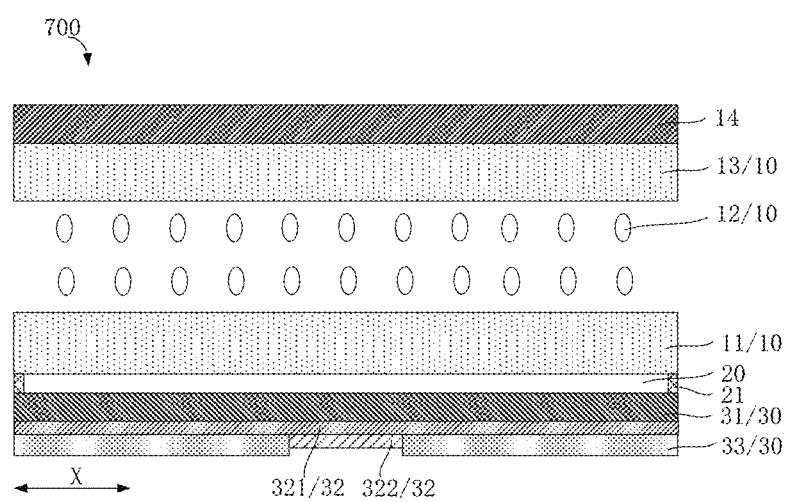
FIG. 8 illustrates a seventh cross-sectional view of the display panel provided in FIG. 1 along an AA' direction.

As shown in FIG. 8, an embodiment of the present disclosure provides a display panel 700. The difference between the display panel 700 and the display panel 100 is that an orthographic projection of the first alignment layer 321 on the substrate 31 in the display panel 700 covers an orthographic projection of each second polarizer 33 on the substrate 31.

Specifically, the first alignment layer 321 covers a surface of the substrate 31, and the second polarizer 33 is disposed on a side of the first alignment layer 321 facing away from the substrate 31. Setting the first alignment layer 321 over the entire surface and setting the second polarizers 33 on the side of the first alignment layer 321 facing away from the liquid crystal cell 10 can increase the contact area between each second polarizer 33 and the first alignment layer 321, make the overlapping area between each second polarizer 33 and the first alignment layer 321 flat, improve the attachment effect between the first alignment layer 321 and the second polarizer 33, avoid warping and bubbling at the splicing position, and prevent from the seam at the splicing position to realize seamless splicing.

Figure 9:
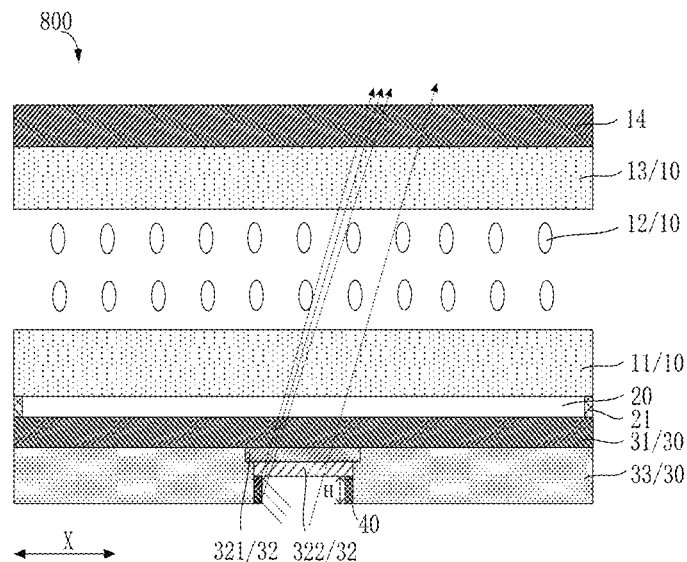
FIG. 9 illustrates an eighth cross-sectional view of the display panel provided in FIG. 1 along an AA' direction.

As shown in FIG. 9, an embodiment of the present disclosure provides a display panel 800. The difference between the display panel 800 and the display panel 100 is that the display panel 800 further includes a reflective layer 40. The reflective layer 40 is disposed on a side wall of each second polarizer 33 proximate to the polarizing layer 322.

In an embodiment of the present disclosure, a material of the reflective layer 40 includes mirror ink. Preferably, the mirror ink can be mirror silver ink. The mirror silver ink is coated and dried to obtain the silver reflective layer 40. The mirror silver ink includes 15-25 parts by weight of resin, 20-30 parts by weight of diluent, 3-5 parts by weight of curing agent, 1-2 parts by weight of coupling agent, 40-60 parts by weight of electroplated aluminum paste and 1-2 parts by weight of mercapto-modified silicone. Specifically, the reflectivity of the reflective layer 40 to visible light is greater than or equal to 98%.

In an embodiment of the present disclosure, a thickness of the second polarizer 33 is greater than a sum of a thickness of the first alignment layer 321 and a thickness of the polarizing layer 322. That is, a height difference H between the second polarizer 33 and the first polarizer 32 is large, so the light directed towards the side wall of the second polarizer 33 cannot be emitted, resulting in dark lines during display and affecting the display effect. By setting the reflective layer 40 on the side wall of the second polarizer 33 proximate to the polarizing layer 322, the light directed towards the second polarizer 33 can be reflected and emitted, thereby avoiding dark lines at the splicing position and improving the display effect.

Figure 10:
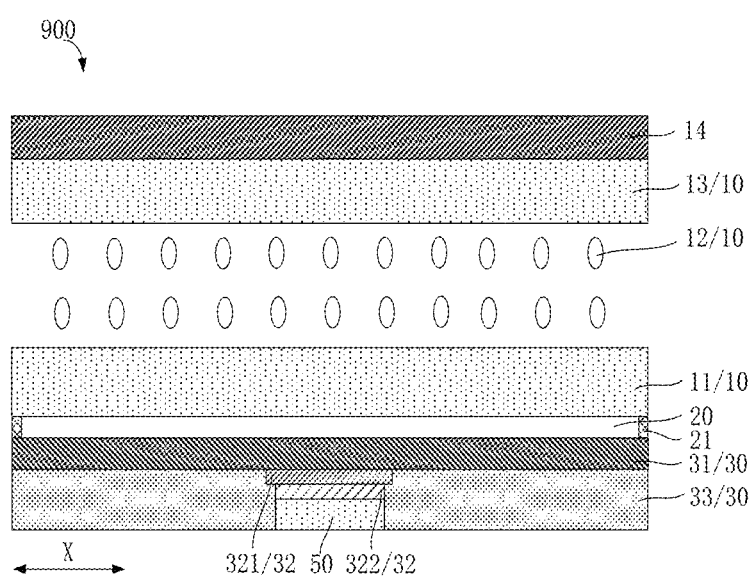
FIG. 10 illustrates a ninth cross-sectional view of the display panel provided in FIG. 1 along an AA' direction.

As shown in FIG. 10, an embodiment of the present disclosure provides a display panel 900. The difference between the display panel 900 and the display panel 100 is that the display panel 900 further includes a transparent material layer 50, and the transparent material layer 50 covers the polarizing layer 322.

In an embodiment of the present disclosure, the second polarizer 33 includes an optical compensation layer, a second alignment layer and a protective layer. The second alignment layer is disposed on a side of the optical compensation layer facing away from the liquid crystal cell 10, and the protective layer is disposed on a side of the second alignment layer facing away from the liquid crystal cell 10. A material of the second alignment layer is different from that of the first alignment layer 321. The material of the second alignment layer includes polyvinyl alcohol and iodine. A material of the protective layer includes cellulose triacetate. The optical compensation layer may be a uniaxial optical compensation layer having only one optical axis.

In an embodiment of the present disclosure, a thickness of the second polarizer 33 is greater than a sum of a thickness of the first alignment layer 321 and a thickness of the polarizing layer 322. That is, a height difference between the second polarizer 33 and the first polarizer 32 is large, so that air is present in an area formed by the height difference between the first polarizer 32 and the second polarizer 33. A refractive index of air (about 1) is less than that of the first polarizer 32 or the second polarizer 33 (about 1.5), and the difference between the refractive index of air and that of the first polarizer 32 or the second polarizer 33 may lead to dispersion. That is, when viewing from the side, there may be colored bright lines at the splicing position, and the color of the bright lines may be changed with the change of viewing angle, thereby affecting the display effect. In the present disclosure, by setting the transparent material layer 50, the sum of the thicknesses of the first alignment layer 321, the polarizing layer 322 and the transparent material layer 50 is greater than or equal to the thickness of the second polarizer 33, so as to fill the height difference between the first polarizer 32 and the second polarizer 33.

Furthermore, a material of the transparent material layer 50 includes glue. An absolute value of a difference between the refractive index of the transparent material layer 50 and the refractive index of the protective layer is less than 0.1. The refractive index of the transparent material layer 50 is close to the refractive index of the protective layer of the second polarizer 33 proximate to the light-emitting surface, so as to solve the problem of colored bright lines at the splicing position and effectively improve the display effect. Specifically, the difference between the refractive index of the transparent material layer 50 and the refractive index of the protective layer may be 0.01, 0.02, 0.03, 0.04, 0.05, 0.06, 0.07, 0.08, 0.09 or 0.1. Preferably, the difference between the refractive index of the transparent material layer 50 and the refractive index of the protective layer is less than 0.05.

In an embodiment of the present disclosure, the refractive index of the transparent material layer 50 is in a range from 1.5 to 1.7. The refractive index of the transparent material layer 50 may be 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69 or 1.70. Preferably, the refractive index of the protective layer is 1.61, and the refractive index of the transparent material layer 50 is 1.67.

Figure 11:
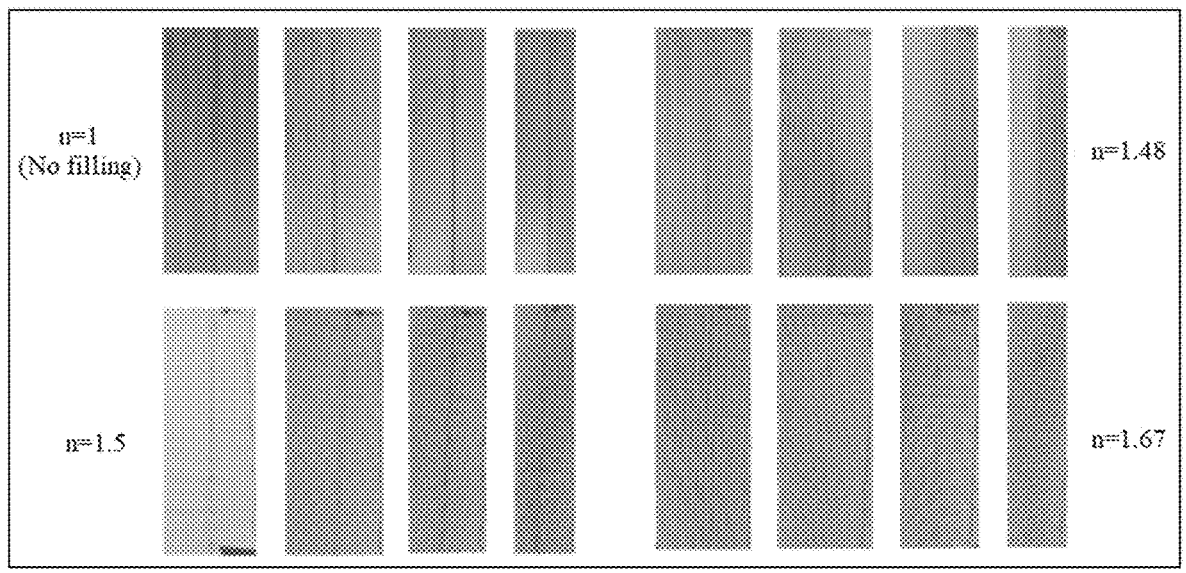
FIG. 11 illustrates a comparative view of display effects of display panels provided by some embodiments of the present disclosure.

As shown in FIG. 11, the refractive index of the protective layer is 1.61. In the case that the first polarizer 32 is not filled, the bright lines on the display screen are visible. After the first polarizer 32 is filled with the transparent material layer 50, the bright line problem is alleviated, especially when the refractive index of the transparent material layer 50 is 1.67, the effect is the optimal.

Figure 12:
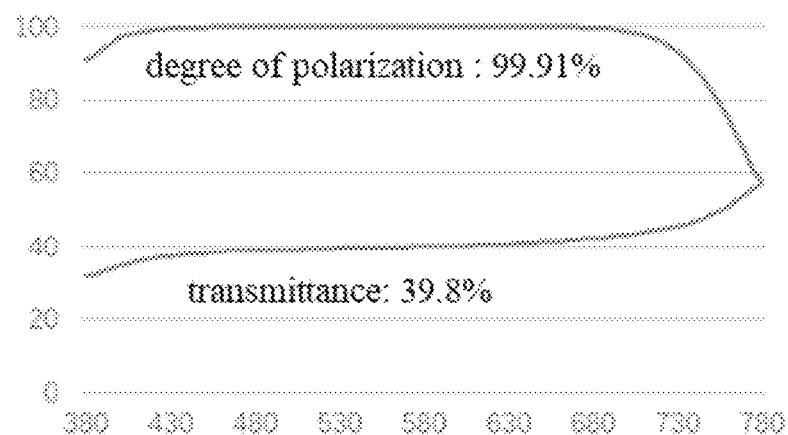
FIG. 12 illustrates a simulation view of a first polarizer in a display panel provided by some embodiments of the present disclosure.

As shown in FIG. 12, the degree of polarization of the first polarizer 32 is greater than or equal to 99.9%. The transmittance of the first polarizer 3220 is greater than or equal to 39.8%, which is beneficial to improve the display uniformity of the display panel.

In another aspect, an embodiment of the present disclosure further provides a method for preparing a display panel, including the following steps.

A transparent homogeneous dielectric layer 20 is formed on a liquid crystal cell 10.

A polarizing assembly 30 is formed on the transparent homogeneous dielectric layer 20, as shown in FIGS. 13A to 13E, and a preparation method of the polarizing assembly 30 includes the following steps.

Figure 13A:
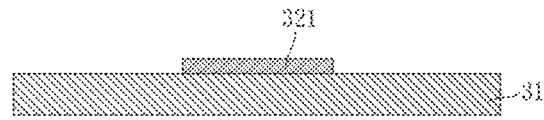
FIG. 13A to FIG. 13E illustrate a flowchart of a first preparation of a display panel provided by some embodiments of the present disclosure.

As shown in FIG. 13A, a first alignment layer 321 is formed on the substrate 31. The first alignment layer 321 is formed on the substrate 31 by coating.

Figure 13B:
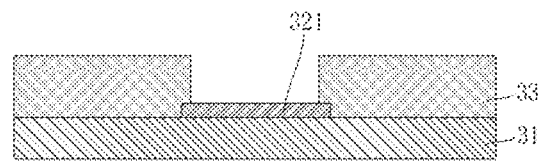

As shown in FIG. 13B, second polarizers 33 are attached to two opposite sides of the first alignment layer 321, and the second polarizers 33 partially cover the first alignment layer 321.

Figure 13C:
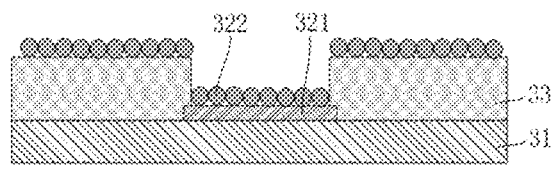

As shown in FIG. 13C, a material of a polarizing layer 322 is coated on the first alignment layer 321 and the second polarizers 33.

Figure 13D:
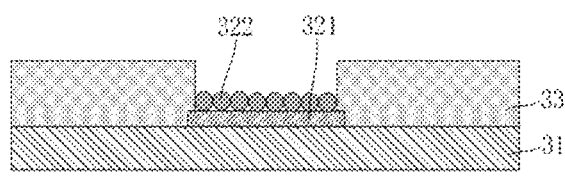

As shown in FIG. 13D, the material of the polarizing layer 322 on the second polarizers 33 is removed, and a distance between the and the second polarizer 33 is less than or equal to a predetermined threshold. Specifically, the material of the polarizing layer 322 on the second polarizers 33 is removed by cleaning.

Figure 13E:
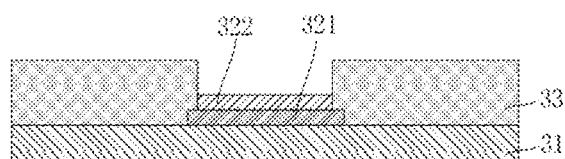

As shown in FIG. 13E, the material of the polarizing layer 322 on the first alignment layer 321 is cured to form a polarizing layer 322.

Figure 14A:
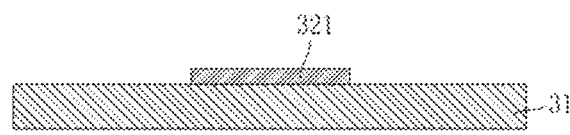
FIG. 14A to FIG. 14E illustrate a flowchart of a second preparation of a display panel provided by some embodiments of the present disclosure.

As shown in FIGS. 14A to 14 E, an embodiment of the present disclosure provides another method for preparing a polarizing assembly 30, including the following steps.

As shown in FIG. 14A, a first alignment layer 321 is formed on a substrate 31. The first alignment layer 321 is formed on the substrate 31 by coating.

Figure 14B:
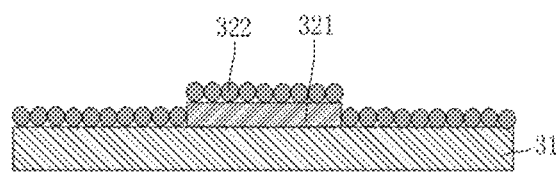

As shown in FIG. 14B, a material of a polarizing layer 322 is coated on the first alignment layer 321 and the substrate 31.

Figure 14C:
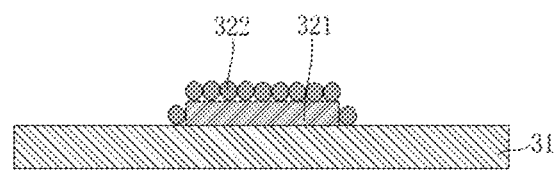

As shown in FIG. 14C, the material of the polarizing layer 322 on the substrate 31 is removed so that the material of the polarizing layer 322 covers the first alignment layer 321.

Figure 14D:
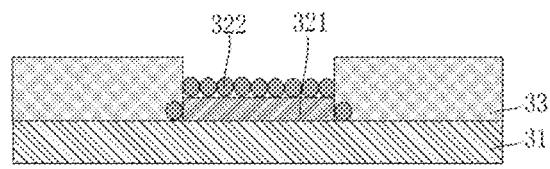

As shown in FIG. 14D, the material of the polarizing layer 322 covering the first alignment layer 321 is cured to form a polarizing layer 322.

Figure 14E:
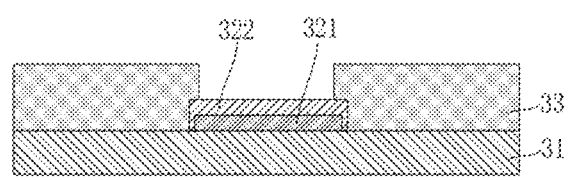

As shown in FIG. 14E, second polarizers 33 are attached to two opposite sides of the polarizing layer 322, and the second polarizers 33 partially cover the polarizing layer 322. The material of the polarizing layer 322 on the second polarizers 33 is removed by cleaning, and the polarizing layer 322 is cured to form the polarizing assembly 30.

According to the preparation method of the display panel in the present disclosure, the second polarizers 33 in the prepared display panel partially cover the first polarizer 32, so as to realize seamless splicing and solve the problem of light leakage caused by the seam at the splicing position of the second polarizers 33. In addition, the transparent homogeneous dielectric layer 20 is disposed between the liquid crystal cell 10 and the polarizing assembly 30, so that the distribution of light from the liquid crystal cell 10 to the polarizing assembly 30 or from the polarizing assembly 30 to the liquid crystal cell 10 is more uniform, so as to alleviated the rainbow pattern phenomenon caused by uneven color mixing of light and improve the display effect of the display panel.

The display panels provided by the embodiments of the present disclosure have been described in detail above. The description of the above embodiments is only used to help understand the core idea of the present disclosure, and the above description should not be understood as limiting the scope of protection of the present disclosure.

What is claimed is:

1. The polarizing assembly comprises: a substrate; a first polarizer comprising a first alignment layer and a polarizing layer, wherein the first alignment layer is disposed on the substrate, and the polarizing layer is disposed on a side of the first alignment layer facing away from the substrate; and two adjacent second polarizers are disposed on opposite sides of the first alignment layer.

2. The display panel according to claim 1, wherein the liquid crystal cell further comprises a border area, the polarizing assembly is connected with the border area, a cavity is defined between the polarizing assembly and the display area of the liquid crystal cell, and the transparent homogeneous dielectric layer is an air layer in the cavity.

3. The display panel according to claim 1, wherein a transparent adhesive layer is filled between the polarizing assembly and the liquid crystal cell, and the transparent homogeneous dielectric layer is the transparent adhesive layer.

4. The display panel according to claim 1, wherein the substrate is disposed on the liquid crystal cell, the first polarizer is disposed on a side of the substrate facing away from the liquid crystal cell, and the transparent homogeneous dielectric layer is disposed between the display area of the liquid crystal cell and the substrate.

5. The display panel according to claim 1, wherein the first polarizer and the second polarizers are disposed on the liquid crystal cell, the substrate is disposed on a side of the first polarizer and the second polarizers facing away from the liquid crystal cell, and the transparent homogeneous dielectric layer is disposed between the display area of the liquid crystal cell and the first polarizer and between the display area of the liquid crystal cell and the second polarizers.

6. The display panel according to claim 1, wherein the display panel further comprises a third polarizer, the polarizing assembly is disposed on one of a light-emitting surface and a light-entering surface of the liquid crystal cell, and the third polarizer is disposed on another of the light-emitting surface and the light-entering surface of the liquid crystal cell.

7. The display panel according to claim 1, wherein each of the second polarizers partially covers the first alignment layer, an orthographic projection of the polarizing layer on the substrate is in non-overlapping with an orthographic projection of the second polarizers on the substrate, and a distance between the polarizing layer and each of the second polarizers is less than or equal to a predetermined threshold.

8. The display panel according to claim 1, wherein each of the second polarizers partially covers the polarizing layer.

9. The display panel according to claim 7, wherein a width of an overlapping area of each of the second polarizers and the first alignment layer along a first direction is greater than or equal to 0.1 mm.

10. The display panel according to claim 8, wherein a width of an overlapping area of each of the second polarizers and the polarizing layer along a first direction is greater than or equal to 0.1 mm.

11. The display panel according to claim 7, wherein the predetermined threshold is in a range from 0 mm to 3 mm.

12. The display panel according to claim 1, wherein a thickness of each of the second polarizers is greater than a sum of a thickness of the first alignment layer and a thickness of the polarizing layer.

13. The display panel according to claim 12, wherein the thickness of the first alignment layer is in a range from 0.1 μm to 5 μm, the thickness of the polarizing layer is in a range from 0.1 μm to 5 μm, and the thickness of each of the second polarizers is in a range from 100 μm to 200 μm.

14. The display panel according to claim 1, wherein the display panel further comprises a reflective layer, and the reflective layer is disposed on a side wall of each of the second polarizers proximate to the polarizing layer.

15. The display panel according to claim 1, wherein the display panel further comprises a transparent material layer covering the polarizing layer, and a sum of a thickness of the first alignment layer, a thickness of the polarizing layer and a thickness of the transparent material layer is greater than or equal to a thickness of the second polarizers.

16. The display panel according to claim 15, wherein each of the second polarizers comprises an optical compensation layer, a second alignment layer and a protective layer, the second alignment layer is disposed on a side of the optical compensation layer facing away from the liquid crystal cell, and the protective layer is disposed on a side of the second alignment layer facing away from the liquid crystal cell; and an absolute value of a difference between a refractive index of the transparent material layer and a refractive index of the protective layer is less than 0.1.

17. The display panel according to claim 15, wherein a refractive index of the transparent material layer is in a range from 1.5 to 1.7.

* * * * *